E. KAST.
CIGAR-CUTTER.
No. 187,641. Patented Feb. 20, 1877.
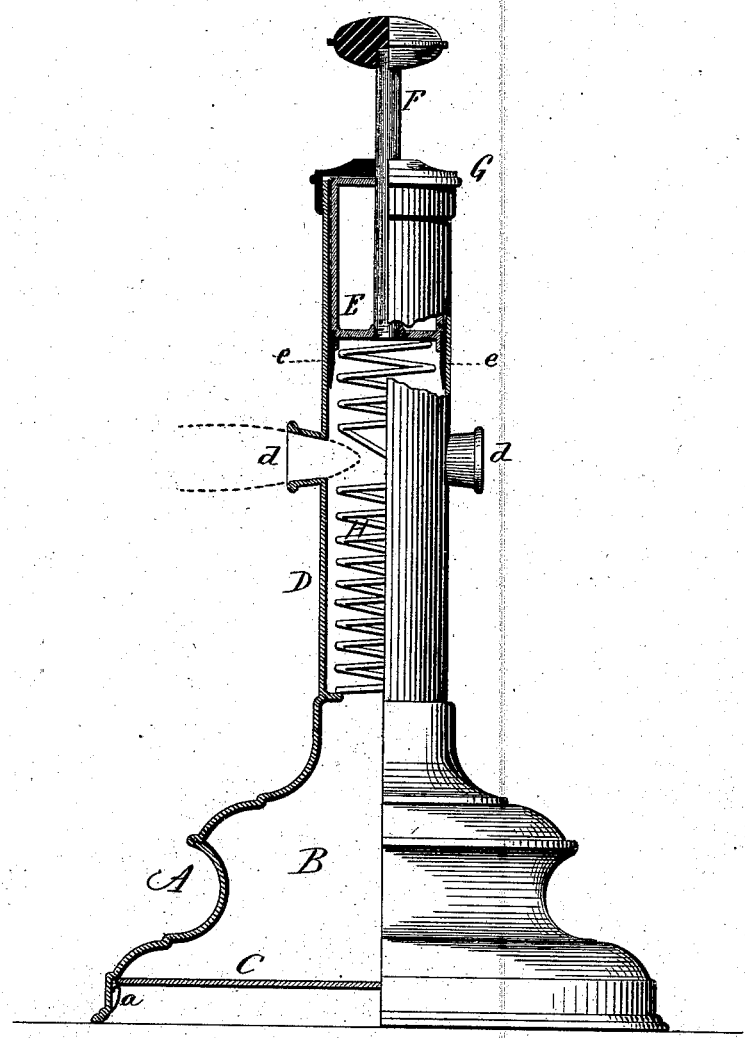

UNITED STATES PATENT OFFICE.

ERNST KAST, OF WATERBURY, CONNECTICUT, ASSIGNOR OF TWO-THIRDS HIS RIGHT TO LOUIS WENZEL AND EMIL MILLER, OF SAME PLACE.

IMPROVEMENT IN CIGAR-CUTTERS.

Specification forming part of Letters Patent No. 187,641, dated February 20, 1877; application filed November 11, 1876.

*To all whom it may concern:*

Be it known that I, ERNST KAST, of Waterbury, in the county of New Haven and State of Connecticut, have invented a new Cigar-Cutting Device; and I do hereby declare the following, when taken in connection with the accompanying drawings and letters of reference marked thereon, to be a full, clear, and exact description of the same, and which said drawings constitute part of this specification, and represent a sectional side view.

The object of this invention is a device to stand upon the counter of cigar-stands, and serve as a convenient means for cutting off the tips of cigars, and depositing the tips in a receptacle. It consists in a base, which forms a chamber for the clippings, with a vertical tube extending therefrom, constructed with one or more apertures, through which the tip of the cigar will be introduced into the said tube, combined with a cylindrical cutter within said tube, arranged to be moved vertically, and pass the said apertures, so as to clip the end of the cigar, the clipping to fall through the tube into the receptacle below, as more fully hereinafter described.

A is the base, which is made of any desirable external form or design, preferably from sheet metal, so as to leave a chamber, B, therein, and is constructed with a removable bottom, C, here represented as secured by a spring, *a*, which will allow of the removal of the bottom. From this base a tube, D, extends upward, and this tube is provided with one or more transverse apertures, *d*, of sufficient diameter to allow of the introduction of the tip of a cigar, as seen in broken lines, the tip to extend within the tube. Within this tube a cutter-head or piston, E, is arranged, fitting closely the inside of the tube, but so as to be moved vertically therein by means of a headed rod, F, passing up through the cap G of the tube, and beneath is a spiral or other suitable spring, H, the tendency of which is to force and hold the piston upward.

The piston is provided with a cylindrical cutter or cutters, *e*, corresponding to the apertures *d*, so that as the piston is depressed, the cutters will pass the apertures and cut off the ends of the cigar-tips, the chippings falling into the receptacle B below, from whence they may be removed at pleasure.

I do not wish to be understood as broadly claiming a tube having an aperture in its side and a cutter within, to vertically pass the said aperture for trimming the ends of cigars, as such I am aware is not new.

I claim—

The combination, in a cigar-clipper, of the base A, removable bottom C, forming a receptacle, B, for the clippings, the vertical tube D on said base, one or more apertures, *d*, in said tube, the vertical slide F, carrying cutters *e*, and the spring H, all substantially as shown and described.

ERNST KAST.

Witnesses:
 JACOB BUCKNER,
 CHAS. W. GILLETTE.